United States Patent Office 3,254,041
Patented May 31, 1966

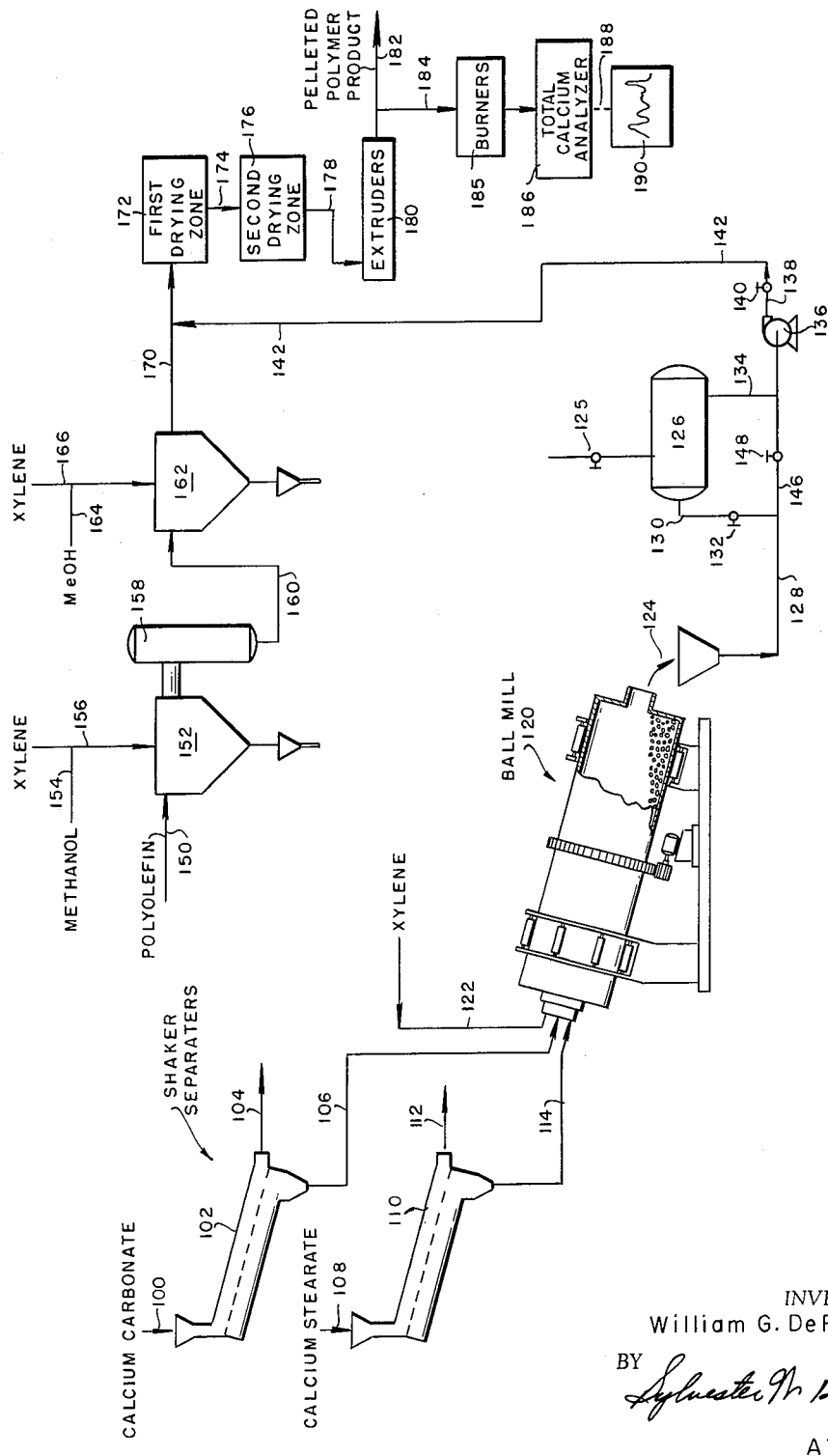

3,254,041
STABLE SLURRY OF CALCIUM CARBONATE AND CALCIUM STEARATE, AND METHODS OF MAKING AND USING IT
William G. De Pierri, Jr., Baytown, Tex., assignor, by mesne assignments, to Esso Research and Engineering Company, Elizabeth, N.J., a corporation of Delaware
Filed Dec. 28, 1961, Ser. No. 162,659
11 Claims. (Cl. 260—23)

The present invention relates to a stable slurry comprised of calcium carbonate and calcium stearate. In its most specific aspect, the invention relates to a stable slurry of calcium carbonate and calcium stearate in xylene. In another aspect, the present invention relates to a method of adding known quantities of calcium carbonate and calcium stearate to a polyolefin product before the ultimate drying thereof. In another aspect, the present invention relates to a process for controlling the amount of calcium carbonate and calcium stearate in a product polyolefin.

The present invention has particular application in the treatment of polyolefins formed by using chlorine-containing catalysts such as Ziegler catalysts, $TiCl_3$, $TiCl_3 \cdot AlCl_3$, etc., and formed by polymerization of monomers such as alpha olefins having 2 to 8 carbon atoms including ethylene, propylene, butylenes, 2-methyl butenes, and the like, and mixtures thereof. The invention has specific utility with respect to polypropylene formed from propylene in the presence of a $TiCl_3 \cdot AlCl_3$ catalyst.

Polymerized olefins require the addition of a number of compounds in order to affect the chemical and physical properties of the polyolefin to maximize the commercial value thereof. For example, polymerized olefins are often corrosive to mold surfaces unless an inhibitor is included in the polyolefin when produced. For that purpose, calcium stearate is usually added to the polyolefin in order to coat the mold surface with a protective film. Another characteristic of polyolefins which must be improved by the use of additives is the oxidative stability of the polyolefin, and this may be accomplished by the addition of calcium carbonate in small quantities.

In the process of manufacturing polyolefins, the addition of inhibitors such as calcium stearate and calcium carbonate must be accomplished at a point in the manufacturing process which will allow the inhibitor to be completely mixed with the polyolefin before the finished product is obtained. In order to minimize expenditure for inhibitors and to prevent undue contamination of the polymer by additives, it is desirable to be able to control the amount of inhibitor added within very fine limits in order to accomplish the desired degree of inhibition with a minimal addition of inhibitor.

Where both calcium carbonate and calcium stearate are to be added to the polymer, two correlative problems arise: (1) obtaining a representative calcium-bearing sample, and (2) determining the proportion of the total calcium in the sample pellet that is attributable to the stearate. Attempts to inject the carbonate and the stearate in separate streams have failed in both respects: (1) complete and homogeneous mixing of both the stearate and the carbonate has not been attained, resulting in a non-uniform distribution of the stearate and the carbonate, and (2) since no direct test for the stearate is practicable in the minute quantities involved, the lack of homogeneity militates against the determination of the stearate content by a ratio of the injection rates compared to total calcium in the sample pellet.

By the practice of the present invention, both problems are solved by introducing the calcium carbonate and calcium stearate in a stable, homogeneous slurry. Since every portion of the slurry has the same ratio of stearate-to-carbonate, any calcium-containing pellet will contain the same ratio of stearate-to-carbonate, and a determination of total calcium will lead to the determination of the stearate concentration.

The importance of using a stable slurry of calcium stearate and calcium carbonate cannot be overstressed. Unless the calcium stearate and calcium carbonate are added in a completely homogenous state, the proportions of each which are in the slurry being added at any given period of time may vary, and, therefore, the amount of calcium attributable to the stearate is not subject to accurate determination. Settlement of the solids in storage would result in variations in the amount of solids added to the polyolefin per unit volume of slurry, and the sample withdrawn would not be representative. Since the stearate is somewhat soluble in the slurry liquid, the proportions of carbonate and stearate would change with the degree of settling, and the stearate level in the sample could not be determined. Further, the uneven distribution would result in a failure to maintain the calcium stearate level in each pellet at the minimum required to prevent corrosion.

It is extremely important that the slurry to be introduced be stable over a wide range of temperatures and for a considerable length of time since the normal operation in commercial use might require that the slurry be prepared and then allowed to stand over a period of several days or longer, subject to temperature variations related to changes in ambient temperature. By the practice of the present invention, a stable slurry may be obtained which maintains its coherency over a long period of time and is resistive to settling induced by temperature changes.

The polyolefin product to which the slurry of the present invention is to be added is formed generally in the following manner. An alpha olefin such as ethylene, propylene, butylene, etc., is dried and introduced into a reaction zone wherein it is contacted at a temperature within the range of 0° F. to 250° F. with a catalyst such as titanium trichloride-aluminum chloride cocrystals and an aluminum alkyl. An exothermic reaction is obtained and the temperature is maintained by cooling. The product stream comprising an admixture of atactic and isotactic polyolefin products is contacted with methanol and hydrogen chloride in order to deactivate the catalyst and precipitate the isotactic polyolefin and thereby separate it from the atactic polyolefin. The isotactic polyolefin being the desired product, it is recovered from the solution containing the soluble atactic polyolefin in a first separation zone wherein it may be washed with methanol and xylene. The separated "raw" polymer is passed to a second separation zone wherein it is washed with xylene and methanol, and the washed cake is then passed through a plurality of drying zones before being extruded into a final pelletized product. The separation zones may suitably comprise pan filters, centrifuges, or other suitable separation means. The preferred point of injection of the slurry of the present invention is at the point between the second filter and the first drying zone since during the drying operation the powdered polyolefin is well tumbled and admixed, allowing the calcium carbonate and calcium stearate of the slurry to be completely admixed therewith, while concurrently evaporating the xylene carrier. It should be understood that the slurry of the present invention may also be introduced intermediate the first and second drying zones if sufficient drying capacity is available in the second drying zone to remove the xylene from the slurry while obtaining the desired complete admixtures.

All of this will be better understood by a reference to the single figure wherein a preferred mode of the present invention is set forth. The slurry of the present invention is formed by introducing particulate calcium carbonate by way of line 100 into a first classifier 102, which may suitably comprise a vibrating-screen type of classifier. The calcium carbonate may be natural (mined) or precipitated, and is separated into a portion having a particle size greater than 15 microns which is discharged by way of line 104 for submission to size reduction apparatus (not shown) and into a portion of particles having a size less than 15 microns, which is discharged by way of line 106. Similarly, calcium stearate is introduced by way of line 108 into a second classifier 110 for a similar separation, over-size particles of 15 microns or over being discharged by way of line 112 for size reduction, and particles having a size less than 15 microns being discharged by way of line 114. Suitable mixing apparatus, shown in FIG. 1 as a ball mill 120, is provided for forming a stable slurry of the calcium carbonate, calcium stearate and xylene introduced by way of line 122. When a ball mill is used for mixing, particle sizes up to 50 microns can be used since size reduction will occur during mixing. The product will still contain particles having a maximum size of 15 microns. The three components of the stable slurry are admixed within mixing device 120, which suitably is a ball mill but which may be any mixing device, at a temperature within the range from 60° F. to 120° F. for a time period of 30 minutes to 20 hours. A preferred final size range of solid particles in the slurry product is within the range of from 5 to 10 microns. The product from mixer 120 is discharged as shown at 124 as a stable slurry, which may be stored in a tank such as 126 by passing through line 128, line 130 controlled by valve 132, and discharged as needed by way of line 134, pump 136, line 138 controlled by valve 140, line 142, and introduced into admixture with the polyolefin. Alternatively, the storage facilities may be bypassed and the stable slurry may be used as formed by closing valve 132 and passing the slurry by way of line 146 controlled by valve 148 and thence through line 134, pump 136, and lines 138 and 142 for admixture with the polyolefin product. At this point it should be noted that the stable slurry stored within the tank means 126 is capable of standing without agitation for a period of seven days or more without separating and is suitable for use in the manner above set forth, or the slurry may be transported from tank 126 in drums and added to the polyolefin by means of a separate metering pump (not shown).

The polyolefin (e.g., polypropylene) having been formed by a reaction as described above and having had the catalyst deactivated and isotactic polypropylene precipitated, the admixture of methanol, deactivated catalyst, dissolved atactic polypropylene, and precipitated isotactic polypropylene is passed by way of line 150 to a pan filter 152. In filter 152, the isotatic polypropylene is separated as a solid precipitate, washed with methanol and xylene introduced by way of lines 154 and 156, and discharged by way of means 158 and line 160 into a second filter 162 which suitably may be a centrifugal filter wherein the isotactic polypropylene is again washed with methanol and xylene introduced by way of lines 164 and 166, respectively. The washed isotactic polypropylene product is discharged from pan filter 162 and is admixed with the slurry of the present invention in line 170, from whence the admixture is passed into a first drying zone 172 which may suitably comprise a rotary drum dryer. From the first drying zone, which accomplishes only a partial drying, the stillwet product is passed by way of line 174 into a second drying zone 176 which may be a dryer of the same character as that in the first drying zone, or may comprise a suitable drier of a different type. A preferred combination is to have a rotary drum in each drying zone.

In the first and second drying zones, the solvent remaining in the polypropylene as well as the xylene in the slurry of the present invention is removed, and the solid polyolefin and solid calcium carbonate and calcium stearate are intimately mixed, being discharged by way of line 178 as a substantially homogeneous mixture. The discharged product is passed into one or more extruders 180 from whence a pelletized polymer product is withdrawn by way of line 182. The pelletized product will contain the calcium stearate and calcium carbonate in substantially complete admixture with the polymer so that any polymer pellet will be representative of the composition of the entire batch. A portion of the pelleted product is withdrawn from line 182 by way of line 184 and is passed into a burner 185 wherein the polyolefin is burned off, leaving an ash residue. The ash is mixed with electrode carbon in a liquid carrier, dried, and introduced into analyzer 186.

The analyzer 186 may suitably comprise means for heating the ash to incandescence (e.g., by electrical excitation or flame) and for measuring the radiation therefrom with an emission spectrometer to determine the amount of total calcium present in the pellet. Th emission spectrometer is suitably coupled to an electrometer whereby an electric signal proportional to the total calcium content may be generated and utilized by way of control line 188 to operate a recording device 190 whereby the total calcium content may be easily determined. Alternatively, a flame photometer may also be employed to measure the total calcium content. Because of the minute amounts of calcium involved in the process, no other practicable method of determination is available.

Thus, it is seen that by the use of the novel slurry of the present invention, a new and useful control system may be used to control very closely the amount of calcium containing inhibitors for use in blending polyolefin products. Since the ratio of calcium stearate to calcium carbonate (and, therefore, to the total calcium in the system) is known and fixed, the signal generated by the electrometer in response to the calcium wavelength will be in a direct ratio to the amount of calcium stearate in the system, and may be used to set a control valve to adjust the rate of addition of the novel slurry to the polyolefin product. Alternatively, the determination of total calcium can be used as the basis for calculation of actual calcium stearate concentration, and the addition rate of the slurry may be then manually adjusted in accordance with the calculated results.

Returning now to the novel slurry of the present invention, it has been stated that the calcium carbonate used may be either the natural (mined) type or the precipitated type of calcium carbonate, of a size range less than 15 microns, preferably within the range of about 5 to 10 microns. Particles larger than 15 microns cause undue settling and must be avoided.

The calcium stearate to be used in the present invention is of a size range less than 50 microns, as in the case of calcium carbonate, preferably within the range of about 5 to 10 microns, and may be admixed with calcium carbonate in a range of between 50 to 500 parts of calcium stearate per hundred parts of calcium carbonate (parts by weight).

The solvent for the slurry preferably comprises xylene, although benzene, toluene, cyclohexane, hexane, or other hydrocarbon solvents may be used, so long as the solvent has a specific gravity within the range of 0.65 to 0.90, is nonpolar, is nonreactive with either calcium stearate, calcium carbonate or the polyolefin, and has a boiling point within the range of 50° C. to 150° C. The presence of polar solvents (such as methanol) in amounts as small as 1% by weight is deleterious and causes gelation of the slurry. The amount of slurry liquid to be used is sufficient to maintain the total solids in the slurry at 40% or less. The constituents of the slurry preferably are admixed by use of a ball mill as above set forth, since the benefit of further size reduction as well as the input of mixing energy may be obtained. However, and particularly where solids of smaller particle size are used, the admixture may be accomplished by use of a supersonic agitator, mechanical agitation, etc.

As illustrative of the present invention, the following examples are given.

Example 1

100 g. of mined calcium carbonate of a particle range of 1 to 70 microns, average particle size of 15 microns, is admixed with 69 g. of calcium stearate having a particle size range of between 1 and 6 microns, average particle size of 3 microns, and 201 g. of xylene. The material is ball milled for 16 hours at a temperature of 100° F., the calcium carbonate being reduced to a particle size less than 10 microns. The resulting slurry was stable for an indefinite period, samples having been taken at periods longer than one week after formation without evidence of settling.

Example 2

A sample of 100 g. of calcium carbonate having a particle size within the range of 1 to 70 microns, average particle size 15 microns, is ball milled with 152 g. of methanol for a period of 63 hours at a temperature of 100° F. The product slurry settles in about 30 minutes although the calcium carbonate was reduced in size to a maximum of 10 microns.

Example 3

100 g. of calcium carbonate is mixed in a mechanical mixer with 150 g. of methanol. The particle size of the calcium carbonate is within the range of 1 to 70 microns, average particle size 15 microns. The temperature of admixture is 75° F. The resultant methanol-calcium carbonate slurry settles in about 5 minutes.

Example 4

100 g. of calcium carbonate of particle size 1 to 70 microns, average particle size 15 microns, is admixed with 1 g. of calcium stearate of particle size 1 to 6 microns, average particle size 4 microns, and 200 g. of xylene in a ball mill at a temperature of 100° F. for a period of 16 hours. The product slurry settles in a period of 10 minutes.

Example 5

One part by weight of calcium carbonate, particle size 0.10 micron to 0.35 micron, average particle size 0.20 micron, is admixed with 3 parts by weight of calcium stearate, particle size 1 micron to 6 microns, average particle size 4 microns, and 7 parts by weight of xylene by agitation with a propeller type agitator for a period of 1 hour at a temperature of less than 100° F. A stable slurry is obtained, no evidence of settling being discovered after a period of 3 days.

In general, it has been found that stable slurries of calcium carbonate, calcium stearate and liquid carrier may be produced if the ratios by weight are within the range of 100 parts of calcium carbonate, 50 to 500 parts of calcium stearate, and sufficient liquid not to exceed 40% by weight of solids.

Applicant having set forth in detail the nature and essence of his invention and the best mode thereof, what is to be covered by Letters Patent should be determined not by the scope of the specific examples given, but only by the appended claims.

I claim:

1. A method of adding calcium carbonate and calcium stearate to a polyolefin product to improve the mold corrosion and oxidative stability thereof which comprises admixing in a mixing zone 100 parts by weight of calcium carbonate particles having a maximum size of 15 microns with from 50 to 500 parts of calcium stearate particles having a maximum size of 50 microns and sufficient solvent to produce a slurry having a maximum solids content of 40% by weight, said admixing being continued for a time sufficient to form a homogeneous slurry, and admixing said slurry with said polyolefin which is recovered from the polymerization reaction and before said polyolefin has been completely dried.

2. A method in accordance with claim 1 wherein the solvent is xylene.

3. A method in accordance with claim 1 wherein the polyolefin is polypropylene.

4. A method in accordance with claim 1 wherein the mixing zone is maintained at a temperature within the range of 60° F. to 120° F.

5. A method of forming a stable slurry for addition to a polyolefin product which comprises admixing 100 parts by weight of calcium carbonate having a maximum size of 15 microns with 50 to 500 parts by weight of calcium stearate having a maximum particle size of 50 microns, and sufficient solvent to produce a slurry having a maximum solids content of 40% by weight.

6. A method in accordance with claim 5 wherein the solvent is xylene.

7. A method in accordance with claim 5 wherein the admixing step is accomplished at a temperature within the range of 60° F. to 120° F.

8. A method in accordance with claim 7 wherein the admixing step is accomplished in a ball mill.

9. A stable slurry for addition to a polyolefin which consists of 100 parts by weight of calcium carbonate particles having a maximum size of 15 microns, from 50 to 500 parts of calcium stearate particles having a maximum size of 50 microns, and sufficient solvent to produce a slurry having a maximum solids content of 40% by weight.

10. A slurry in accordance with claim 9 wherein the calcium stearate is present in amounts of 60 to 90 parts by weight and the xylene is present in an amount of 200 parts by weight.

11. A slurry in accodance with claim 9 wherein the solvent is xylene.

References Cited by the Examiner

UNITED STATES PATENTS

| | | | |
|---|---|---|---|
| 2,863,784 | 12/1958 | Hillyer | 260—23 |
| 2,883,901 | 4/1959 | Danielsson | 88—14 |
| 2,984,634 | 5/1961 | Caldwell et al. | 260—23 |
| 2,985,617 | 5/1961 | Salyer et al. | 260—45.85 |
| 2,990,748 | 7/1961 | Vallee et al. | 88—14 |
| 2,991,264 | 7/1961 | Monroe et al. | 260—32.6 |
| 3,160,598 | 12/1964 | Delfosse | 260—23 |

LEON J. BERCOVITZ, *Primary Examiner.*

WILLIAM H. SHORT, *Examiner.*